3,544,166
CUTTER TOOLS AND MOUNTINGS THEREFOR

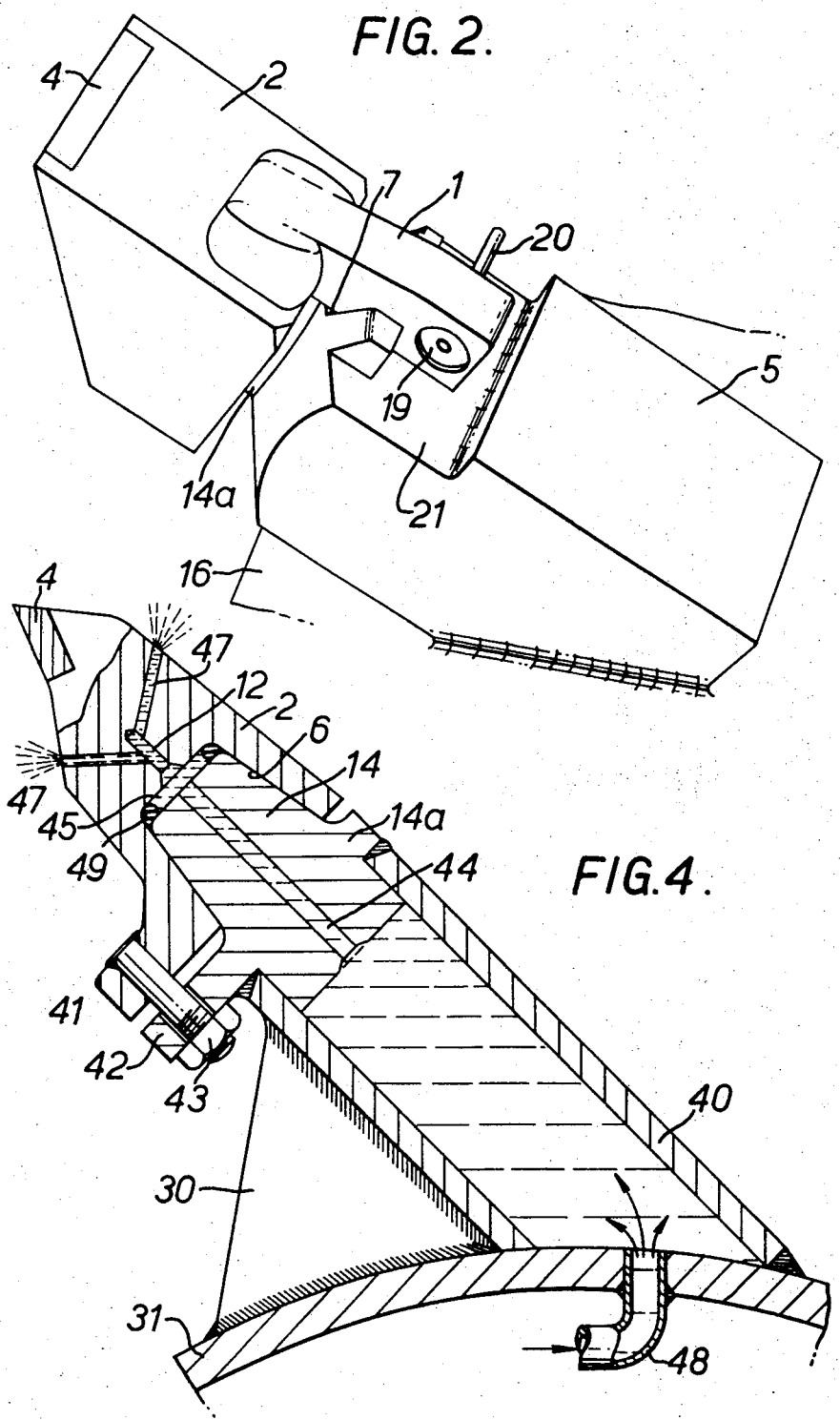

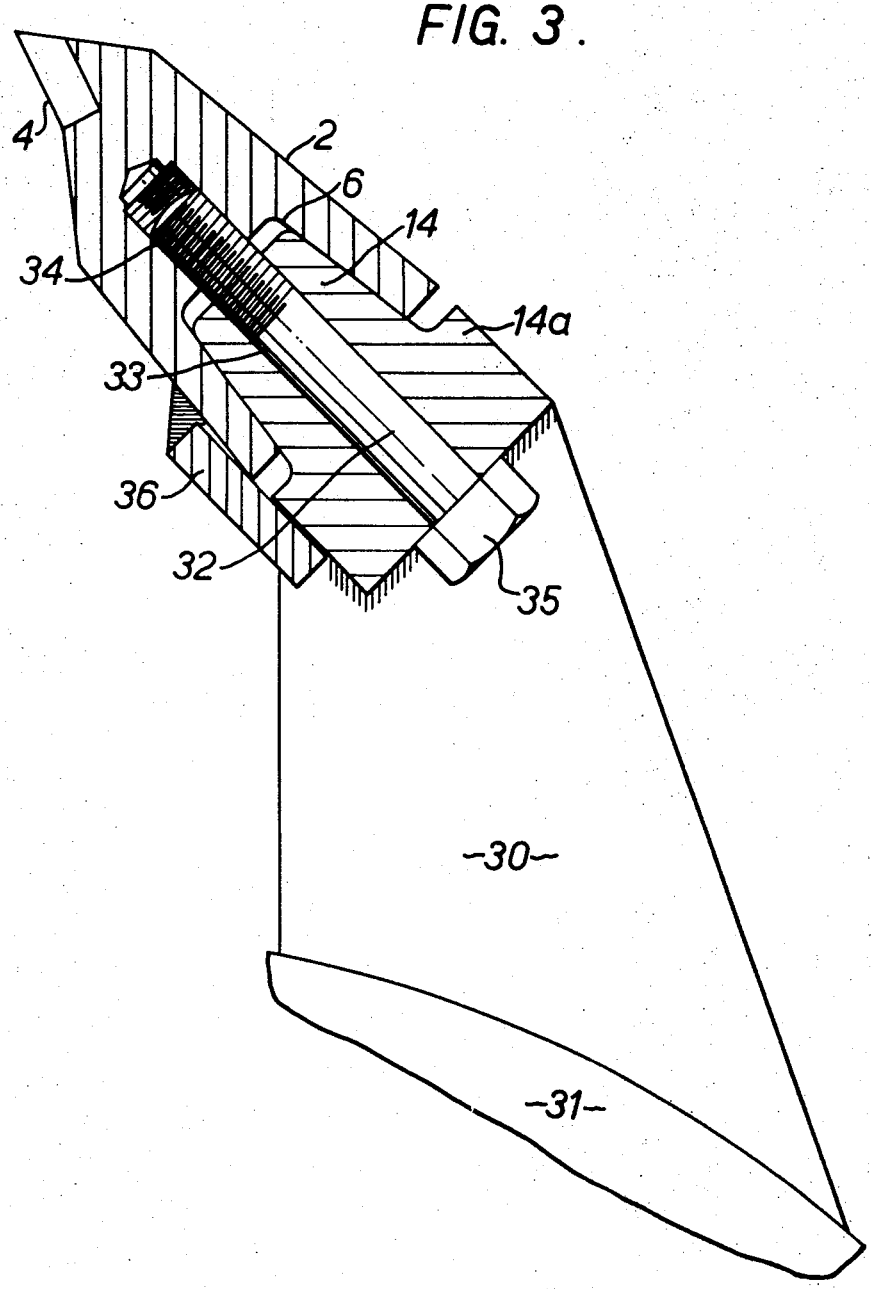

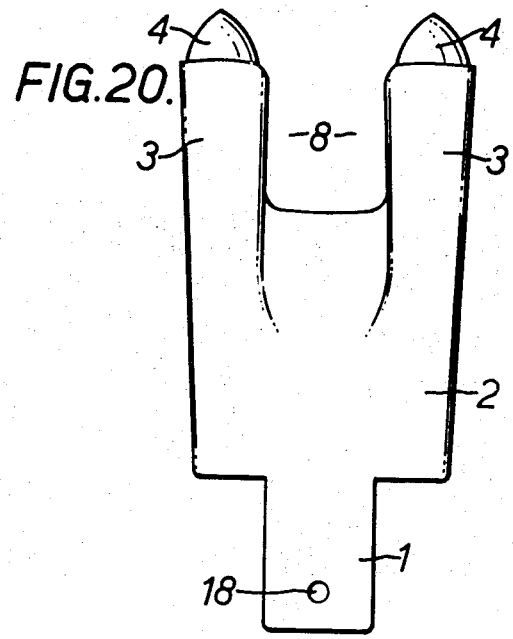
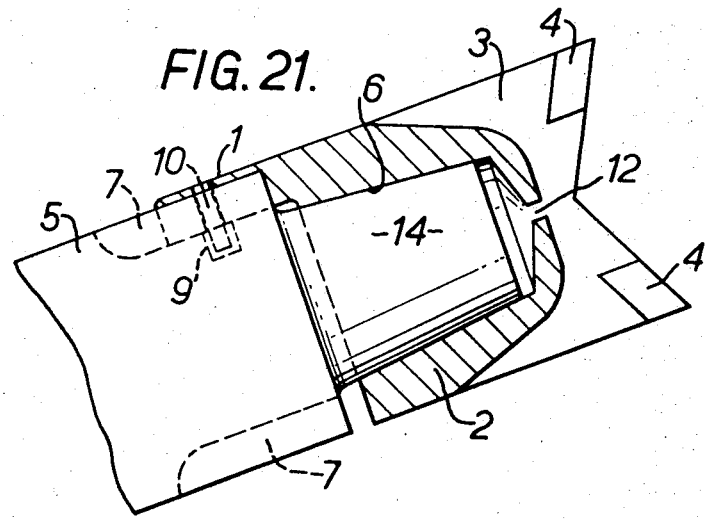

Sidney E. Proctor, High Wycombe, England, assignor to Austin Hoy and Company Limited, High Wycombe, England
Continuation-in-part of application Ser. No. 527,570, Feb. 15, 1966. This application Nov. 19, 1968, Ser. No. 776,965
Claims priority, application Great Britain, Feb. 17, 1965, 6,936/65; Mar. 16, 1965, 11,138/65; Nov. 22, 1967, 53,263/67; June 10, 1968, 27,566/68
Int. Cl. E21c *35/18*
U.S. Cl. 299—81                                                13 Claims

ABSTRACT OF THE DISCLOSURE

A coal cutter pick having a body formed with a tapered recess of circular cross-section for accommodating a similarly shaped projection on a support, the pick being squat in shape and the recess occupying a substantial portion of the body whereby a rigid and secure connection can be established between the pick and support. In one embodiment, the pick has a passage through it for liquid coolant and in another embodiment a tongue extended rearwardly from the pick is used to engage a recess on the mining machine to additionally secure it in place.

---

This invention is concerned with mineral cutter tools and mountings therefor and is a continuation in part of my application Serial No. 527,570, filed Feb. 15, 1966. More particularly, but not exclusively, the invention is concerned with coal-cutter picks of the kind arranged to be mounted on coal cutting machinery such as disc shearer drums, road heading machines or cutter chains.

Heretofore coal-cutter picks have been mounted on disc shearer drums or cutter chains in pick blocks having holes for receiving shanks of the picks. The ends of the shanks may be screw-threaded and project from the pick blocks so as to receive nuts for holding the picks in position.

It is an object of the present invention to provide improved means for mounting cutter tools, e.g. coal-cutter picks, on supports.

According to one aspect of the invention there is provided a mineral cutter pick adapted to be mounted on a mineral cutting machine and to cut during translational movement thereon, which pick comprises a body having a recess of circular cross-section for accommodating a projection on a support on a mineral cutting machine to mount the pick on the machine, said recess being adjacent its inner end not substantially less in diameter than at its outer end and the forward end of the body at least immediately beyond the recess being not substantially less in cross-sectional area than at its base end, said forward end carrying a cutting edge.

When a cutter tool is in use it is often necessary to supply liquid for lubricating, cooling or other purposes to or adjacent to the point of contact of the tool and the material being cut. For example, in mechanical coal cutting dust suppression is vital at the coal face, and almost every known coal cutter has a water spray associated therewith in use.

It is a further object of the present invention to provide improved liquid-supply means for cutter tools, since it has been found that cutter tools and mountings therefor according to the present invention readily enable improved liquid-supply means to be provided.

Accordingly, the invention also provides the combination of a cutter tool and a support wherein the cutter tool has a recess which accommodates a projection on a support so that the tool is mounted thereon, said support having a liquid tank or reservoir disposed adjacent to the projection and means provided for supplying liquid through the reservoir to an outlet adjacent to the cutting part of the tool.

From another, aspect, the invention provides the combination of a cutter tool and a support wherein the cutter tool has a recess which accommodates a projection on a support so that the tool is mounted thereon, said projection having a passage therethrough communicating with a passage through the tool for flow of liquid to an outlet adjacent to the cutting part of the tool. Preferably, the passage through the projection communicates directly with a liquid supply tank or reservoir having a liquid supply inlet and carried by the support.

The invention further provides a cutter tool which has a recess for accommodating a projection on a support so that the tool is mounted thereon, which tool has a passage therethrough for liquid, the passage leading from an inlet in the recess to at least one outlet adjacent the cutting part of the tool.

The recess in the tool is preferably in the form of a socket. The projection preferably comprises a tapered boss, although a parallel (i.e. untapered) boss may be used.

Means are preferably provided for preventing rotation of the tool on the projection.

Where the projection is a tapered boss and the socket has matching taper, the tool may be mounted on the projection and maintained in position by the wedging action of the engaging taper faces. Moreover the cutting force will tend to keep the tool in position securely on the projection. Preferably, however, means are provided which prevent loss of the tool from the projection should the tool become loose while in operation. Such means may conveniently comprise a latch mounted on either the tool or the support and adapted to resiliently engage a lug on the other of the two components.

As hereinbefore mentioned, the tool may be a coal-cutter pick and in that case the projection may be secured by welding to a disc shearer drum or like member.

Where the tool is a coal-cutter pick, the aforementioned passages are for feeding water to suppress dust. The arrangement is particularly useful when the pick is mounted on a disc shearer drum.

Heretofore, dust suppression using disc shearer drums has been effected by spraying water on to the drum continuously during coal-cutting operations. However, it is desirable that water should be sprayed only where coal-cutter picks are actually operating. Various proposals have been made for a "phased" water spray of that kind involving rather complicated control gears.

According to a further aspect of the present invention, there are provided water spray control means for a coal-cutter device having picks mounted on supports, the picks having recesses which accommodate respective projections on the supports so that the picks are mounted thereon, said supports being secured to a carrier rotatable about a horizontally-extending axis, which control means comprise gravity-operated valves mounted on said carrier and arranged to allow flow of water to water sprays on said carrier at or adjacent to cutting positions of said picks and to cut off flow of water at other positions of said picks.

Preferably, said valves comprise balls movable into and out of engagement with valve seats under the action of gravity as the carrier rotates. The balls may be disposed in cages in the aforesaid supports, the supports being mounted on the carrier.

Usually, the cutter picks are used to cut over a half-circle on one side of a vertical line through the axis of rotation of the carrier. In that case, the valves are arranged to provide water spraying over said half-circle and to prevent water spraying over the opposite half-circle.

In coal-cutter picks and the like it is usual for the cutting part to be an insert of a hard material, e.g. tungsten carbide, and because of the hardness of the material of the insert together with the method by which it is secured to the tool, it is difficult to arrange the liquid outlet at the optimum position, i.e. close to the cutting face of the insert.

According to one embodiment of the invention therefore, there is provided a tool of the kind having a recess for accommodating a projection on a support so that the tool is mounted thereon, the tool having a passage therethrough for liquid, the passage leading from an inlet in the recess to at least one outlet provided adjacent the cutting part of the tool, comprising a cutting part divided into two or more laterally paced portions, the liquid outlet being arranged to lie between the spaced portions.

From another aspect of the invention, the tool is provided with a rearwardly extending tongue adapted to be received in a correspondingly shaped slot in a support, the tongue and the slot being formed with alignable holes adapted to receive a dowel pin. Preferably the hole in the support is of larger diameter than the hole in the tool so that the dowel pin is a loose fit in the support. Where the support is tapered in form and the recess is correspondingly shaped so that in use the tool is wedged firmly on the support, the dowel pin acts to prevent the tool from coming away from its support in the event of the tool becoming loose on the projection.

According to a further aspect of the invention, there is provided a mineral cutter pick of the kind adapted to be mounted on a mineral cutting machine and to cut during translational movement thereon, said pick having a body with a recess for accommodating a projection on a support on a mineral cutting machine so that the pick is mounted thereon and with at least one forward projection from the front face of said body, which forward projection is narrower than and extends the depthwise of the body and carries a cutting edge.

The manner of mounting the pick enables a secure mounting to be obtained for a pick with a body of substantial width. The width of the body and the provision of said projection(s) renders a considerable variety of cutting edge arrangements possible by suitable positioning of the projection(s) and the cutting edge(s) thereon.

While a cutting edge or edges extending across the front face of the pick body may be suitable for some purposes (e.g. cutting coals with pronounced planes of cleavage and which readily fracture into small pieces), difficulty may occur in other applications (e.g. cutting more coherent minerals such as potash and certain coals). For use with more coherent minerals, it is preferred that the cutting edge(s) extend(s) depthwise of the pick body, preferably substantially parallel to a central plane through the pick body in the cutting direction.

Forward projections with cutting edges may be spaced apart on both sides of said central plane. Alternatively, a cutting edge or edges may be provided at only one position across said front face. Cutting edges may be provided adjacent the top and bottom of the front face so that the pick can be reversed. Cutting edges may be provided at more than two positions across the front face.

From yet another aspect the invention provides a mineral cutter tool having a recess for accommodating a projection on a support on a mineral cutting machine so that the tool can be mounted thereon, the tool comprising a body having at least two oppositely disposed pairs of laterally spaced cutter tips each of which is provided with a cutting edge extending in a direction depthwise of the cut to be made by the tool, the arrangement being such that the cutter tips are usable one pair at a time and that when one pair of the tips becomes blunted, the tool can be moved to a different position on its support to bring the other pair of tips into operative position.

Preferably the forward end of the body is formed with a pair of laterally spaced projections therefrom, one cutter tip of each pair of cutter tips being arranged on each projection.

Advantageously the tool is provided with a rearwardly extending tongue adapted to be received in a correspondingly shaped slot in the support, the tongue and the slot being formed with alignable holes adapted to receive a dowel pin. Preferably the hole in the support is of larger diameter than the hole in the tool so that the dowel pin is a loose fit in the support. Preferably the projection on the support is tapered in form and the recess is correspondingly shaped so that in use the tool is wedged firmly on the support. Preferably each cutter tip is an insert of a hard material e.g. tungsten carbide.

The following is a description, by way of example only, of several embodiments of coal-cutter picks and mounting supports therefor in accordance with the invention, reference being made to the accompanying drawings, in which:

FIG. 2 is a perspective view of the embodiment shown in FIG. 1 in the assembled state;

FIG. 3 is a section through another embodiment of the pick and support;

FIG. 4 is a section through a third embodiment showing water supply arrangements;

FIG. 20 is an end view of the pick shown in FIGS. 18 and 19;

FIG. 21 is a cross-sectional side elevation of the pick shown in FIGS. 18 to 20, mounted on a support.

Figure 1:
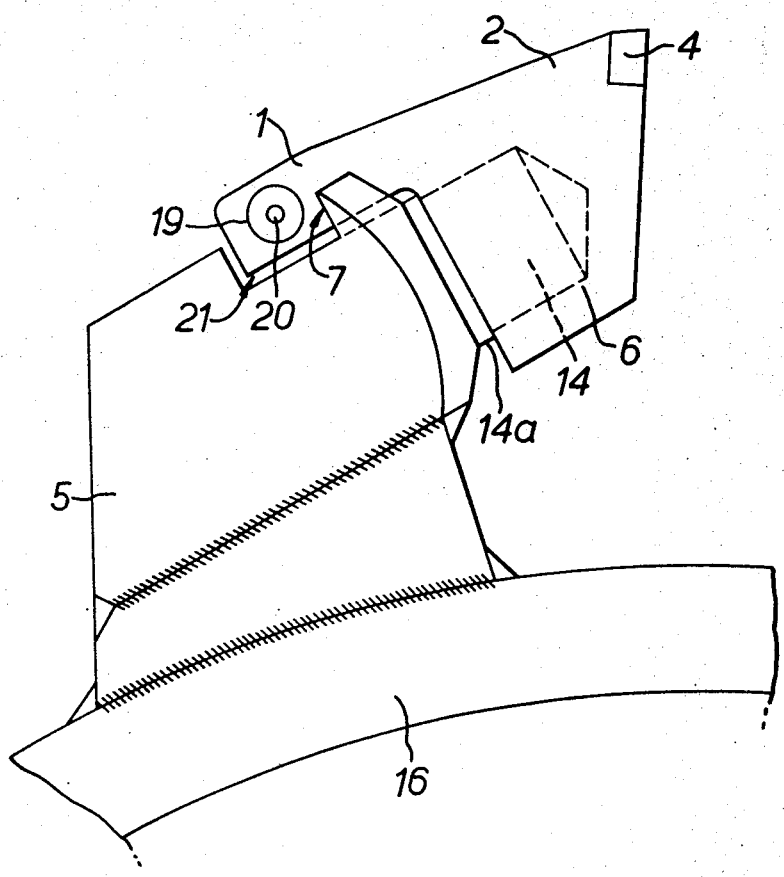
FIG. 1 is a section through an embodiment of the pick and support.

Referring firstly to FIGS. 1 and 2 there is shown a coal-cutter pick comprising a body 2 having a hard tip insert 4 of the usual kind. The body 2 is of hollow form, having a recess in the form of a tapered socket 6. Within the socket 6 fits a tapered portion 14 of a projection in the form of a boss 14a on a support block 5, so that the tool may be mounted thereon. The support 5 is welded to a disc shearer drum indicated schematically at 16.

The pick is maintained in position by the wedging action of the engaging taper faces. Moreover the cutting force when the pick is operative will tend to keep the pick in position securely on the boss 14a.

above comprises a cutting tip 4 and a tapered recess 6 which is adapted to receive a correspondingly shaped projection 14 on a pick holder 5.

The pick 2 is provided with a rearwardly extending tongue 1 adapted to be received in a corresponding slot 7 in the holder 5, the tongue and the holder being formed with holes 18 and 9 respectively which are aligned when the pick is in position on the projection.

In operation the pick is firmly wedged on to its support 14 with the tongue 1 lying in the slot 7. A dowel pin 10, which is a force fit in the hole 18 is driven-in flush with the top of the pick so that it lies in both the holes 18 and the hole 9. The pin 10 is preferably a loose fit in the hole 9. Thus if the pick comes loose on the projection it will be held against complete removal by the dowel pin.

Figure 12:
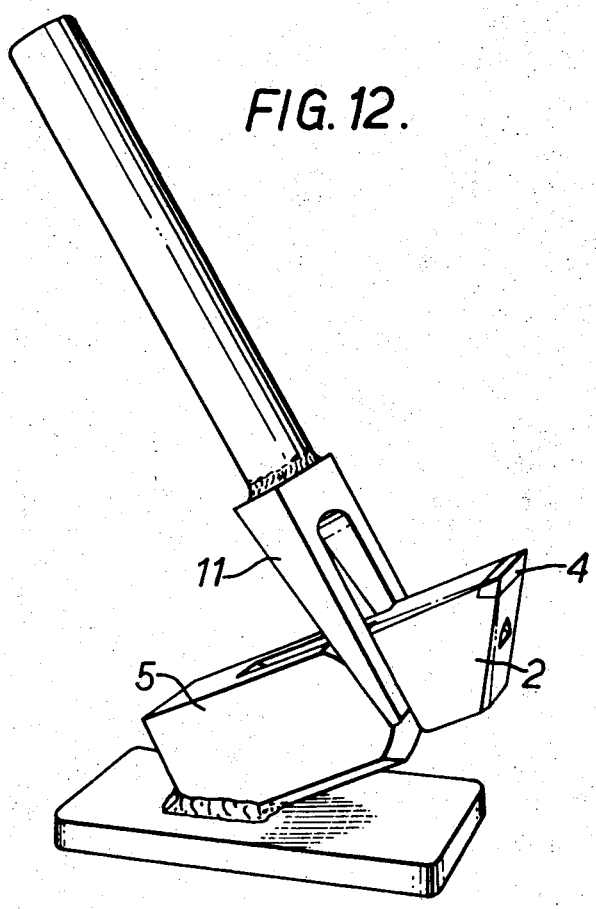
FIG. 12 is a perspective view of the tool shown in FIG. 11 mounted on the support shown in FIG. 10 and showing a device for removing the tool from the support.

FIG. 12 shows bifurcated wedge-ended extractor 11 used to break the taper when it is desired to remove the tool from the holder, the extractor also being effective to shear the dowel pin after the taper has been broken. The extractor 11 acts between shoulders formed on the pick and corresponding shoulders on the holder to force the two apart. Thus it is necessary to replace the dowel pin each time the tool is removed and replaced.

The pick-holder and pick may if desired be provided with passages for supplying liquid to the cutting part of the tool, as in the embodiment described with reference to FIGS. 7 to 9.

Figure 13:
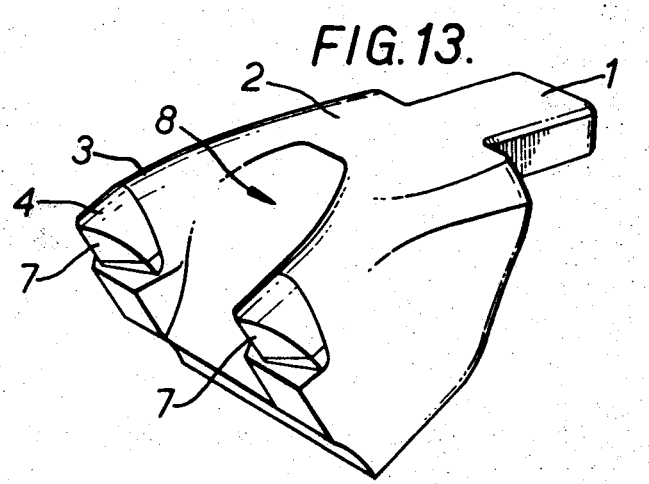
FIG. 13 is a perspective view of a pick.
Figure 14:
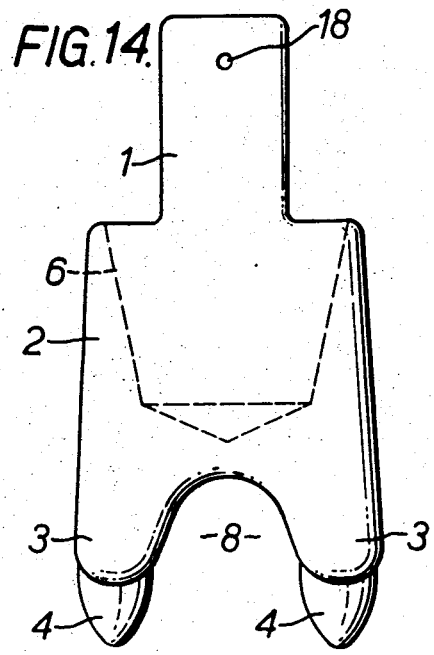
FIG. 14 is a plan view of the pick shown in FIG. 13.
Figure 15:
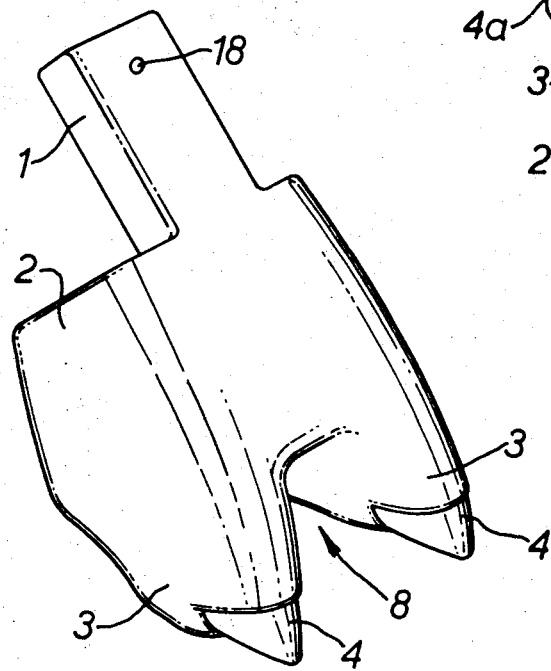
FIG. 15 is a further perspective view of the pick shown in FIGS. 13 and 14.

Referring to FIGS. 13 to 15, a pick comprises a body 2 of generally square cross-section having a tapering recess 6 of circular cross-section by which it can be mounted with a wedging action on similarly tapered projection on a support on a mineral cutting machine. The pick body 2 has a rearwardly extending tongue 1 which is engageable in a slot or groove in said support to prevent rotation of the pick on the projection. A pin may be driven through a hole 18 in the tongue 1 into a hole in said support to resist removal of the pick. At the forward end of the pick are two hard tip inserts 4 (for example, made of tungsten carbide) the inserts being brazed onto projections 3 extending out of the body. The tip inserts may be of a form known per se. Each insert has a cutting edge extending in a plane parallel to the cutting plane of the pick and the cutting edges are symmetrically spaced on opposite sides of said plane adjacent the lateral limits of the pick body. Between the projections 3, the pick body has a curved recess 8. In use the tip inserts tend to cut two parallel grooves in the mineral concerned and mineral between the grooves fractures and passes away from the working face of the mineral through the aforesaid recess between the tip inserts.

If desired more than two tip inserts may be provided.

Figure 16:
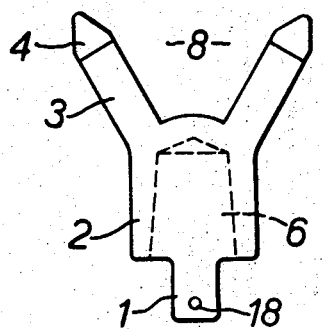
FIG. 16 is a plan of a modified form of pick.

Referring to FIG. 16 there is shown a pick generally similar to that described with reference to FIGS. 13 and 15, with the exception that the pick inserts lie outside the lateral limits of the pick body.

Figure 17:
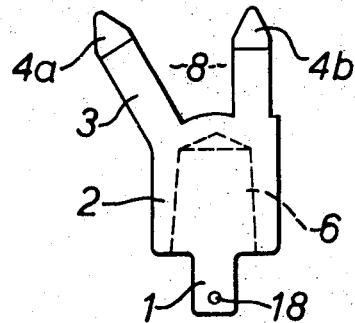
FIG. 17 is a plan of a further modified form of pick.

In FIG. 17 there is shown a pick having one insert 4a which lies outside the lateral limits of the pick body and a further pick insert 4b which lies inside the said lateral limits.

It will be appreciated that if desired the pick body 2 could be other than square in cross-section. For example, it could be circular or a combination of circular and square.

Referring to FIGS. 18 to 21 of the drawings there is shown a tool in the form of a mineral cutter pick comprising a body 2 of generally square cross-section having a wide tapering recess 6 of circular cross-section therein by which the tool can be mounted with a wedging action on a similarly tapered projection 14 on a support 5 on a mineral cutting machine. The pick body 2 has a rearwardly extending tongue 1 which is engageable in a slot or groove 7 in the support 5 to prevent rotation of the pick on the projection. A dowel pin 10 may be driven into a hole 18 in the tongue 1 and into a corresponding hole 9 in the support to resist removal of the pick.

At the forward end of the pick, there is provided an opposed pair of laterally spaced projections 3 extending out of the body, two oppositely disposed pairs of hard cutter tips 4 being mounted on the projections 3, the arrangement being that one cutter tip of each pair is mounted on each projection. The cutter tips may be of a form known per se, for example made from tungsten carbide, and are preferably brazed on to the projections. Each cutter tip has a cutting edge extending in a plane parallel to the cutting plane of the pick and the cutting edges are symmetrically spaced on opposite sides of said plane adjacent to the lateral limits of the pick body. The cutting plane of the pick is a central plane through the pick extending along and depthwise of the cut to be made by the pick. Between the projections 3 the pick body has a curved recess 8.

In use the cutter tips tend to cut two parallel grooves in the mineral concerned and mineral lying between the grooves fractures and passes away from the working face of the mineral through the aforesaid recess between the cutter tips.

It will be appreciated that in use the tool is positioned on the support so that one pair of the cutter tips can cut mineral, the other pair of cutter tips being inoperative. When a pair of cutter tips in use becomes blunted, the tool can be turned through 180° on its support and the other pair of cutter tips brought into operation. Thus the working life of the pick is double that of a normal pick. It will be appreciated that the pick support 5 will need to have slots 7 for receiving the tongue 1 provided on two opposite sides thereof.

Figure 22:
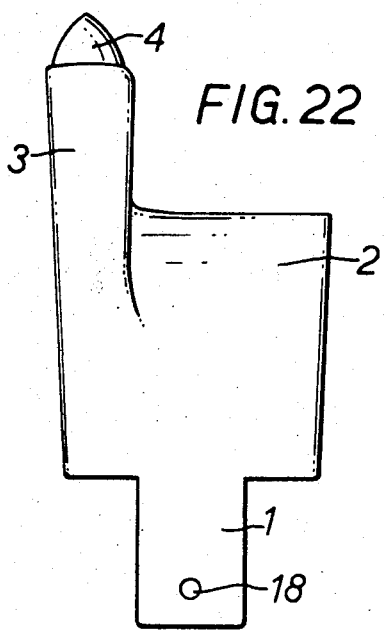
FIGS. 22 to 27 illustrate modified forms of mineral cutter pick according to the invention.

FIG. 22 of the drawings shows a modified form of the pick described with reference to FIGS. 18 to 21 wherein one of the projections 3 (and the attached two tips) is omitted.

Figure 18:
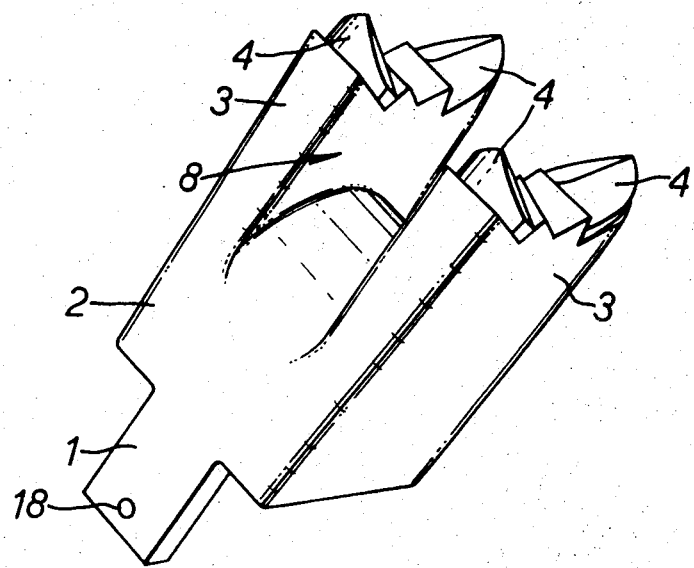
FIG. 18 is a perspective view of a further coal cutter pick.
Figure 19:
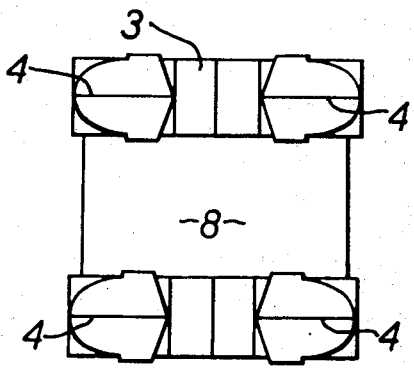
FIG. 19 is a plan view of the pick shown in FIG. 18.
Figure 23:
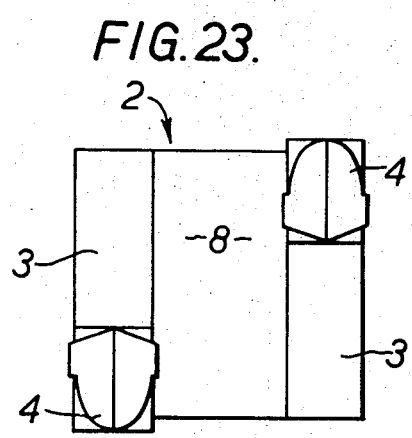

Referring to FIG. 23 there is shown another form of the pick generally described with reference to FIGS. 18 to 21, but wherein one tip and the associated part of the projection is omitted on each side of the pick of FIG. 18 to leave two diagonally opposite tips. In both of these modifications, reversal of the pick is possible and in fact necessary to change from use of one tip to use of the other.

Figure 24:
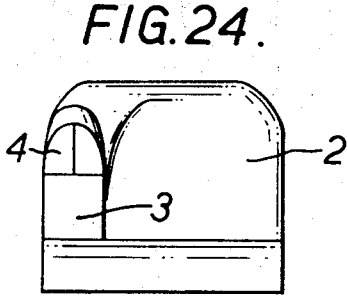
Figure 25:
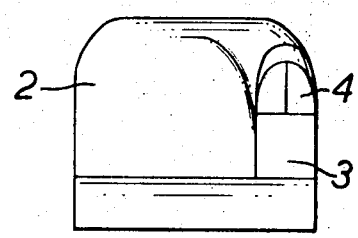
Figure 26:
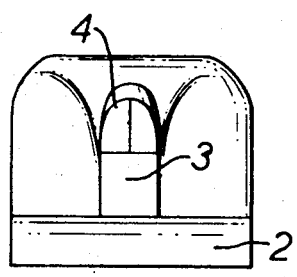
Figure 27:
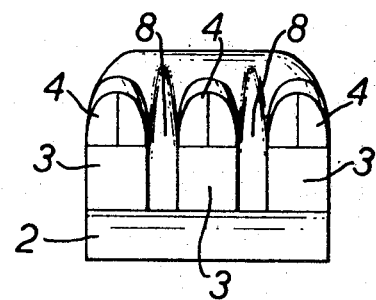

In another form of pick in accordance with the invention (FIGS. 24 and 25) one or the other of the projections 3 on the pick shown FIG. 13 is omitted. In a further form of pick generally similar to that of FIG. 18 (FIG. 26), a single central projection and tip 3 and 4 respectively is provided. In yet another form of pick (FIG. 27), a further projection 3 with tip is provided half way between the projections 3 of the FIG. 13 construction.

If desired a water passageway 12 (FIG. 21) may be provided through the pick from the recess 6. Water may be supplied to the recess through a bore in the projection received in the recess and this water flows through the passageway 12 to spray on the mineral being cut to suppress dust. The outlet of the passageway 12 may be specially formed (e.g. slotted) to ensure spray formation of the passageway may be directly rearwardly towards the support so that impact of the jet of water on the support forms spray.

Where a pick is reversible, as in FIG. 21, it may be provided with two opposite tongues 1 so that both grooves 7 are always occupied and cannot be blocked by dirt.

It will be noted that in all embodiments the mounting projection provides a strong rigid support close behind the front face of the pick and that cutting forces the pick even tighter on to the projection. The pick itself is squat and rigid.

I claim:

1. A mineral cutter pick adapted to be mounted on a mineral cutting machine and to cut during translational movement in an endless path thereon, which pick comprises a body having a recess of circular cross-section for A tongue 1 extends rearwardly from the pick slightly clear of the surface of the block 5 and locates accurately in a slot 7 machined in the block 5. The pick is thereby prevented from rotating on the boss 14a.

The tongue 1 also serves as an extension from the pick and houses a resilient plug 19, conveniently of neoprene, in a cylindrical cross-bore through the tongue. A pin 20 extends co-axially from one end of said plug, the plug and pin together forming a latch. Slot 7 communicates with a cross slot 21 whereby the side walls of the slot 7 serve as lugs. The outer surface of at least one of these lugs is tapered towards the boss 14a as shown so that when the pick is pushed onto the boss the latch pin 20 rides resiliently over the lug and springs back behind the lug into the space of cross slot 21.

Referring now to FIG. 3, the pick comprises a body 2 having a hard tip insert 4 of the usual kind. The body is of hollow form, having a recess in the form of a tapered socket 6. Within the socket 6 fits a tapered portion 14 of a boss 14a which is welded to two gusset plates 30 which are themselves secured, e.g. by welding, to a disc shearer drum 31. The pick body is fastened in position by a bolt 32 which passes through a hole 33 in the boss and screws into a threaded hole 34 in the end of the socket 12. The head 35 of the bolt 32 is accessible at the rear of the boss so that the bolt can be unscrewed and the pick body removed and replaced. To position the pick body properly on the boss and to prevent rotation of the body on the boss during operation, a plate 36 is welded to the underside of the pick body, this plate 36 fitting between the two gusset plates 30.

This embodiment is primarily, but not exclusively, applicable for the larger sizes of coal-cutting picks (e.g. having a width of as much as 2 inches across the cutting edge) such as are used for producing larger coal. The arrangement enables the actual holding means to be located as near to the pick point as possible, thus giving added stability and strength.

Referring now to FIG. 4, the pick comprises a body 2 having a hard tip insert 4 of the usual kind. The body is of hollow form, having a recess in the form of a tapered socket 6. Within the socket fits a tapered portion 14 of a boss 14a which is welded into one end of a tubular member 40 so as to provide a water-tight joint. The member 40 is welded to two gusset plates 30 which are themselves welded to a disc shearer drum 31. The end of the tubular member 40 distant from the boss 14a is welded to the drum 31 to provide a water-tight joint. The pick body has welded thereto a bolt 41 which passes through a hole in a projection 42 on the boss 14a and carries a nut 43. Thus, the pick body is held on the boss in the correct angular position and is prevented from rotating on the boss.

Extending axially through the boss 14a is a passage 44 which communicates via a space 45 at the bottom of the socket 6 with an axial passage 12 in the pick body 2, which passage 12 has connected thereto branch passages 47 opening through the surface of the pick body at positions adjacent to the tip insert 4.

A high pressure water connection 48 passes through the shell of the drum 31 and communicates with the interior of the tubular member 40. High pressure water is supplied to the connection 48 by any suitable means. Thus, water flows from the connection 48 through the tubular member 40 (which provides a water tank or reservoir), through the passage 44, space 45 and passage 12 and out through the branch passages 47. The branch passages 47 are arranged to direct water sprays on to the coal face adjacent the pick so as to suppress dust. The exact position and arrangement of the passages 47 may be chosen to suit the particular conditions under which the pick will be used.

The co-operating tapers in the socket and on the boss may provide the necessary water seal between the pick body and the boss. However, if necessary a rubber washer or sealing ring 49 may be inserted in the socket between the boss and pick body.

It is usually desirable to have water jets or nozzles as near as possible to the tip of the pick and the above-described arrangement facilitates such a disposition of the jets as compared with conventional arrangements which employ external pipes. Also, since coal-cutter picks require to be changed at frequent intervals and in the above-described arrangement the jets are contained in the pick body, the jets can be readily cleared automatically when the pick is removed. Furthermore, the comparatively large cross-section of the waterway through the tubular member 40 provides a header tank or reservoir only a short distance from the final jets and accordingly a more efficient spray can be obtained since the water only travels for very short distances before it is ejected from the pick. With conventional arrangements, a jet is fitted to the end of an external water pipe and, since the pipe is of considerable length, frictional losses in the pipe may result in substantial loss of pressure prior to ejection.

Figure 5:
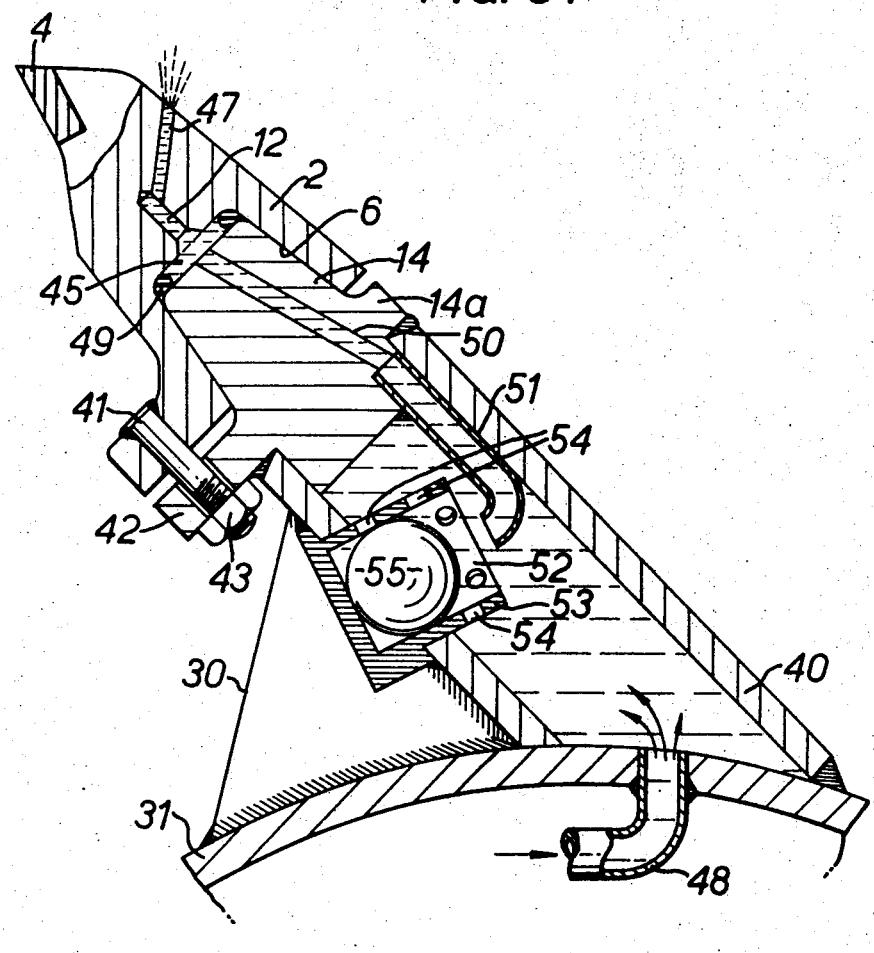
FIG. 5 is a section through a modification of the third embodiment having valve means for controlling the water supply.
Figure 6:
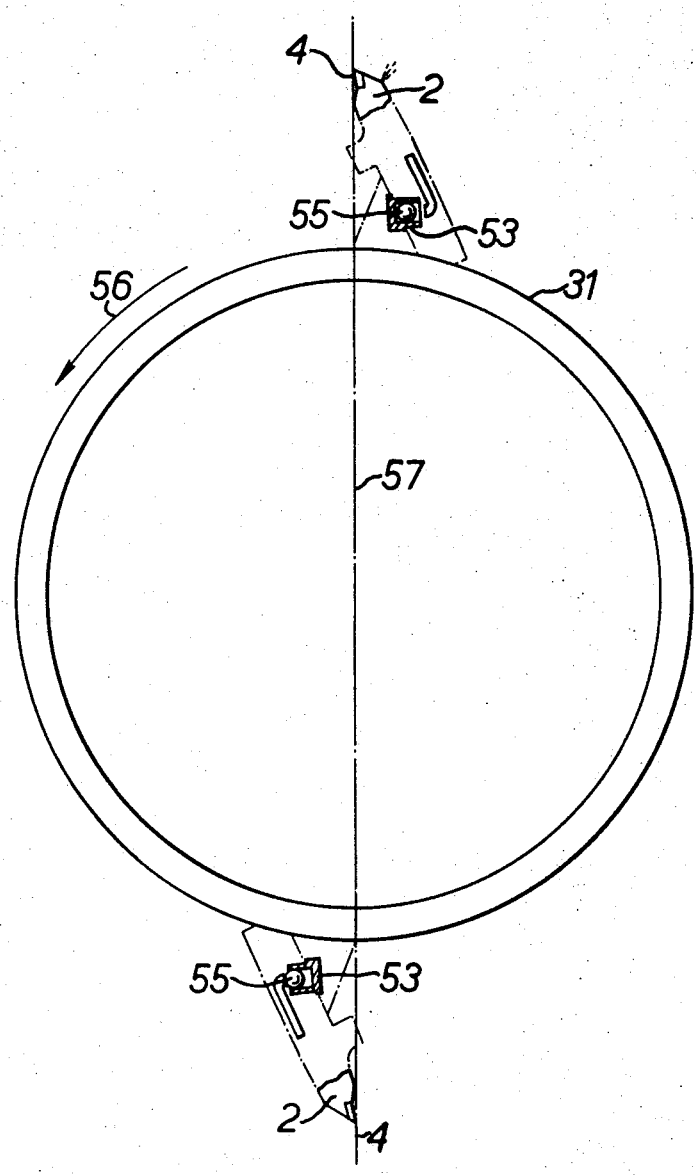
FIG. 6 is a diagrammatic side view showing the disposition of the arrangements of FIG. 2 on a disc shearer drum.

FIGS. 5 and 6 show a modified arrangement in which a pick body 2 is mounted on a boss 14a in the same way as in FIG. 4. However, instead of an axial passage through the boss 14a there is a through passage 50 which is inclined to the axis of the boss. The passage 50 is connected to a tube 51 which extends through the interior of the member 40 to a valve seating 52 in a hollow cylindrical cage 53 also inside the member 40. The cage has holes 54 through which water can pass into the cage and then through the valve seating 52 into the tube 51. The cage contains a valve ball 53 which is reciprocable in the cage into and out of engagement with the valve seating. When the ball engages the seating, flow of water from the cage to the tube 51 is prevented. The holes 54 open into the cage on both sides of the ball. The centreline of the cage is arranged to be inclined downwards from the seating 52 when the tip insert 4 lies vertically above the axis of rotation of the drum 31. As shown in FIG. 6 (which, for convenience of illustration shows only two diametrically opposite pick tips and their associated ball valves), the drum 16 rotates in the direction of arrow 56. Cutting occurs as the picks rotate on one side (the left-hand side in the drawing) of a vertical line 57 through the axis of rotation of the drum. As a coal-cutter pick commences its cutting operation at the top of a coal seam (see the upper-most pick tip in FIG. 6), owing to the angle of the cage axis the ball 55 will move under gravity away from its seat, thus allowing water to pass through the tube 51 and subsequently onto and through the pick. On the completion of the 180° cutting travel of the pick, the ball will, again owing to gravity, roll towards its seat and cut off the water supply to the pick (see the lowermost ball valve in FIG. 3) during the non-cutting part of the pick's rotation.

The weight of the ball and the angle of inclination of the cage axis must of course be selected in relation to the intended speed of rotation of the drum so that centrifugal force does not prevent the necessary movements of the ball to control the water supply.

Figure 7:
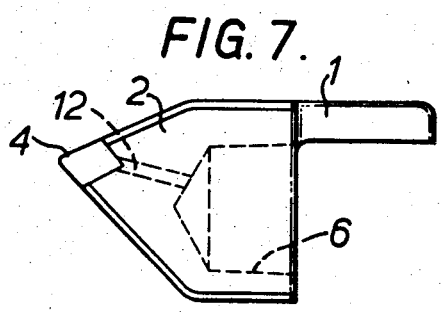
FIG. 7 is a side elevation of a coal cutting pick.
Figure 8:
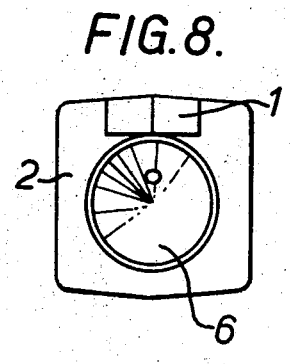
FIG. 8 is an end elevation of the coal cutting pick shown in FIG. 7.
Figure 9:
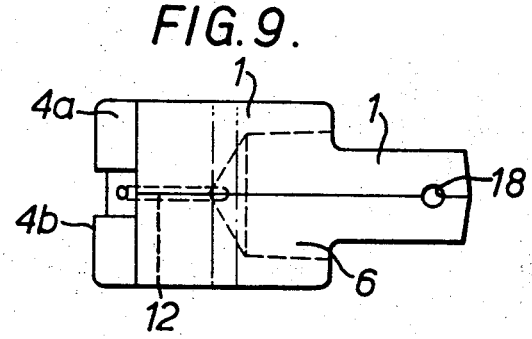
FIG. 9 is a plan view of the coal cutting pick shown in FIGS. 7 and 8.
Figure 11:
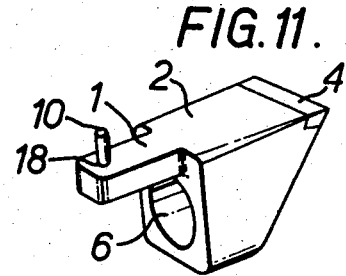
FIG. 11 is a perspective view of a tool.

Referring to FIGS. 7 to 9 of the drawings, a tool or coal cutter pick of the kind more fully described above comprises a hollow body 2 formed with a rearwardly extending tongue 1 and provided with a cutting part 4. As shown in FIG. 9, the cutting part comprises two spaced portions 4a and 4b respectively comprising inserts of tungsten carbide or like hard material.

A liquid passage 12 has an outlet positioned in the gap between the two portions of the cutting part 4 and thus the liquid is brought right up to the pick point so as to minimise or prevent sparking during the cutting operation.

Figure 10:
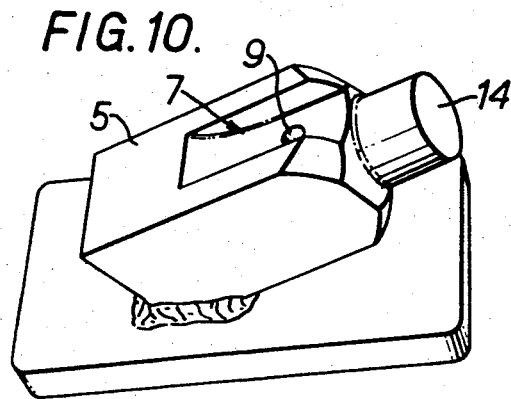
FIG. 10 is a perspective view of a support.

Referring to FIGS. 10 and 12 of the drawings, a coal cutter pick or tool 2 of the kind more fully described accommodating a projection on a support on a mineral cutting machine to mount the pick on the machine, said recess being adjacent its inner end not substantially less in diameter than at its outer end and the forward end of the body at least immediately beyond the recess being not substantially less in cross-sectional area than at its base end, said forward end carrying a cutting part, the pick having a passage therethrough for liquid, the passage leading from an inlet in the recess to at least one outlet provided adjacent the cutting part of the pick, and the cutting part being divided into two or more laterally spaced portions, the liquid outlet being arranged to lie between the spaced portions.

2. A mineral cutter pick as claimed in claim 1, comprising a rearwardly extending tongue adapted to be received in a correspondingly shaped slot in the support, the tongue and the slot being formed with alignable holes adapted to receive a dowel pin.

3. A mineral cutter pick according to claim 2, wherein the hole in the support is of larger diameter than the hole in the pick so that the dowel pin is a loose fit in the support.

4. A mineral cutter pick adapted to be mounted on a mineral cutting machine and to cut during translational movement in an endless path thereon, said pick having a body formed with a recess of circular cross-section for accommodating a projection on a support on a mineral cutting machine so that the pick is mounted thereon, said recess being adjacent its inner end not substantially less in diameter than at its outer end and the forward end of the body adjacent the inner end of the recess being not substantially less in cross-sectional area than at its base end, at least one forward projection extending from the front face of said body, which forward projection is narrower than and extends depthwise of the body and carries a cutting edge, the pick body being formed with means for preventing rotation thereof on the support comprising a rearwardly extending tongue on the body adapted to be received in a correspondingly shaped slot in the support, the tongue having a hole for a dowel pin, which hole is arranged so that it can be aligned with a hole in the slot in the support so that the dowel pin can be driven to lie in both holes.

5. A mineral cutter pick as claimed in claim 4, wherein the hole in the support is of larger diameter than the hole in the pick so that the dowel pin is a loose fit in the support.

6. A mineral cutter pick as claimed in claim 4, wherein the body has a passage therethrough for liquid, said passage leading from an inlet in the recess to at least one outlet adjacent to the cutting edge of the pick.

7. A mineral cutter pick having a body formed with a recess for accommodating a projection on a support on a mineral cutting machine so that the pick can be mounted thereon to cut during translational movement in an endless path, said recess being adjacent its inner end not substantially less in diameter than at its outer end and the forward end of the body at least immediately beyond the recess being not substantially less in cross-sectional area than at its base end, the pick body having means for preventing rotation thereof on the support comprising a rearwardly extending tongue on the body, the tongue being adapted to be received in a correspondingly shaped slot in the support, and the forward end of the pick body being formed with a pair of laterally spaced longitudinally extending projections which together carry two oppositely disposed pairs of cutter tips each of which cutter tips is provided with a cutting edge extending in a direction depthwise of the cut to be made by the pick, the arrangement being such that one cutter tip of each pair is mounted on each projection so that the cutter tips are usable one pair at a time, whereby when one pair of the tips becomes blunted the pick can be moved to a different position on its support to bring the other pair of the tips into operative position.

8. A mineral cutter pick as claimed in claim 7, wherein the hole in the support is of larger diameter than the hole in the pick so that the dowel pin is a loose fit in the support.

9. A mineral cutter pick as claimed in claim 7, wherein the body has a passage therethrough for liquid, said passage leading from an inlet in the recess to at least one outlet adjacent to the cutting part of the pick.

10. A mineral cutter pick having a body formed with a recess for accommodating a projection on a support on a mineral cutting machine so that the pick can be mounted thereon to cut during translational movement in an endless path, said recess being adjacent its inner end not substantially less in diameter than at its outer end and the forward end of the body at least immediately beyond the recess being not substantially less in cross-sectional area than at its base end, the pick body being arranged to prevent rotation thereof on the support and the forward end of the pick body being formed with a pair of laterally spaced longitudinally extending projections which each carry a cutter tip, which cutter tips are provided with a cutting edge extending in a direction depthwise of the cut to be made by the pick, the arrangement being such that the cutter tips are mounted on the longitudinally extending projections so that the cutter tips are usable in concert.

11. A mineral cutter pick as claimed in claim 10, comprising a rearwardly extending tongue adapted to be received in a correspondingly shaped slot in the support, the tongue and the slot being formed with alignable holes adapted to receive a dowel pin.

12. A mineral cutter pick as claimed in claim 11, wherein the hole in the support is of larger diameter than the hole in the pick so that the dowel pin is a loose fit in the support.

13. A mineral cutter pick as claimed in claim 10, wherein the body has a passage therethrough for liquid, said passage leading from an inlet in the recess to at least one outlet adjacent to the cutting part of the pick.

References Cited

UNITED STATES PATENTS

| | | | |
|---|---|---|---|
| 640,622 | 1/1900 | Bailey | 299—91 X |
| 888,256 | 5/1908 | Parsons | 37—142 |
| 993,474 | 5/1911 | Thomas | 299—91 X |
| 2,328,134 | 8/1943 | Fulke | 299—93 |
| 2,802,642 | 8/1957 | Feucht | 175—418 X |
| 2,890,021 | 6/1959 | Sandvig | 175—418 X |
| 3,117,386 | 1/1964 | Ferwerda | 37—142 |
| 3,342,531 | 9/1967 | Krekeler | 299—92 |

ERNEST R. PURSER, Primary Examiner

U.S. Cl. X.R.

37—142; 299—91